(12) United States Patent
Andersson et al.

(10) Patent No.: US 9,840,069 B2
(45) Date of Patent: Dec. 12, 2017

(54) PACKAGING LAMINATE AND PACKAGING CONTAINER FOR A FERMENTED LIQUID MILK PRODUCT

(71) Applicant: TETRA LAVAL HOLDINGS & FINANCE S.A., Pully (CH)

(72) Inventors: Thorbjörn Andersson, Södra Sandby (SE); Kristina Hansson, Stockholm (SE); Marie Skepö, Löddeköpinge (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/905,458

(22) PCT Filed: Jun. 27, 2014

(86) PCT No.: PCT/EP2014/063660
§ 371 (c)(1),
(2) Date: Jan. 15, 2016

(87) PCT Pub. No.: WO2015/007498
PCT Pub. Date: Jan. 22, 2015

(65) Prior Publication Data
US 2016/0159053 A1  Jun. 9, 2016

(30) Foreign Application Priority Data
Jul. 16, 2013  (SE) .................... 1350883

(51) Int. Cl.
*B32B 27/10* (2006.01)
*B32B 27/32* (2006.01)

(52) U.S. Cl.
CPC .......... *B32B 27/10* (2013.01); *B32B 27/32* (2013.01); *B32B 2255/10* (2013.01); *B32B 2255/24* (2013.01); *B32B 2307/7265* (2013.01); *B32B 2553/00* (2013.01)

(58) Field of Classification Search
CPC ..... B32B 27/10; B32B 27/32; B32B 2255/12; B32B 2255/10; B32B 2553/00; Y10T 428/1303; B65D 65/42
USPC ..................................... 428/537.5
See application file for complete search history.

(56) References Cited

U.S. PATENT DOCUMENTS

| | | | |
|---|---|---|---|
| 4,701,360 A * | 10/1987 | Gibbons ............. | B32B 27/10 229/5.82 |
| 2014/0100098 A1 | 4/2014 | Dahl et al. | |

FOREIGN PATENT DOCUMENTS

| | | | | |
|---|---|---|---|---|
| ES | WO 2013014493 A1 * | 1/2013 | ............. | C08J 7/042 |
| WO | WO 2012/163753 A1 | 12/2012 | | |

OTHER PUBLICATIONS

International Search Report (PCT/ISA/210) dated Sep. 24, 2014, by the European Patent Office as the International Searching Authority for International Application No. PCT/EP2014/063660.

* cited by examiner

*Primary Examiner* — Catherine A Simone
(74) *Attorney, Agent, or Firm* — Buchanan Ingersoll & Rooney PC

(57) ABSTRACT

Packaging laminate for a packaging container for a fermented liquid milk product, such as soured milk, yogurt and crème fraîche. The packaging laminate has a paper layer, and outer liquid-tight layers on both sides of the paper layer. One of the outer layers of the packaging laminate has a whey protein surface coating.

20 Claims, 3 Drawing Sheets

PACKAGING LAMINATE AND PACKAGING CONTAINER FOR A FERMENTED LIQUID MILK PRODUCT

TECHNICAL AREA

Figure 1:
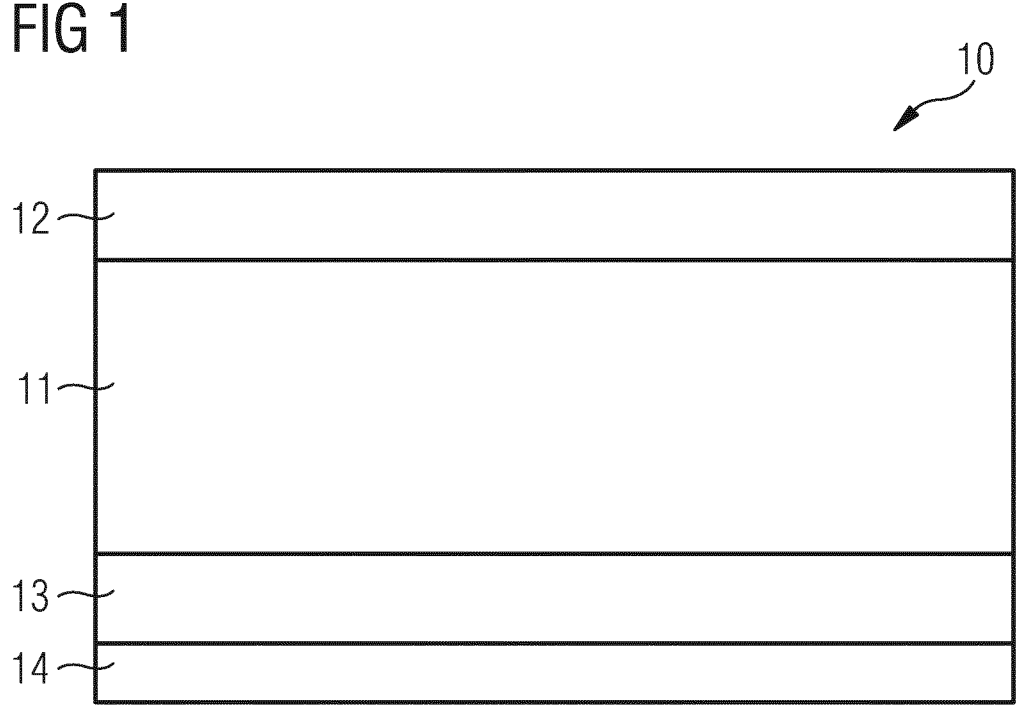

The present invention concerns a packaging laminate for a packaging container, wherein the packaging laminate has a paper layer and outer liquid-tight layers on both sides of the paper layer. The invention furthermore concerns a packaging container produced from the packaging laminate, intended for a fermented liquid or semi-liquid milk product.

BACKGROUND OF THE INVENTION

Fermented liquid milk products, such as soured milk, yogurt and crème fraîche, are commonly prepackaged and transported in disposable consumer packaging. A large number of these disposable packages are produced from a packaging laminate with a rigid but foldable paper layer and outer liquid-tight polyethylene layers, primarily of low density, on both sides of the paper layer. Such packaging containers are currently produced on an industrial scale with the help of modern rational packing machines, which shape, fill and seal prepackaged containers, based on either a material web or pre-manufactured packaging laminate sheets as starting material.

For instance, filled and sealed packaging containers are produced from a packaging laminate material web, by the web first being reshaped into a tube. This is done by joining the two longitudinal edges of the web by means of a longitudinal liquid-tight overlap seam using heat sealing. The tube is filled with the actual fermented liquid milk product, and divided into connected filled packaging units, by means of repeatedly sealing the tube across the tube's longitudinal axis below the tube's product level. The packaging units are separated from one another by means of cuts in the transverse sealed areas, and are finally given the desired geometrical shape, typically parallelepipedic, by means of at least one additional shaping operation.

Alternatively, in a corresponding manner, filled sealed packaging containers are produced from a substantially rectangular, flat-folded tubular material out of the packaging laminate, by the material first being raised to an open tubular container capsule. One of the container capsule's open ends (e.g., the bottom end) is sealed by fold forming and heat-sealing of foldable connected end panels at the bottom end of the container capsule. The container capsule, now provided with a bottom, is filled with the fermented liquid milk product in question through its open end, and is then sealed by fold forming and sealing of the corresponding foldable and connected end panels at the top end of the container capsule.

The common types of packaging containers, regardless of whether they are produced from a material web or from pre-manufactured material sheets or blanks out of the packaging laminate, are generally provided with some form of opening device in order to facilitate access to the packaged milk product when it is time to empty the packaging container of its contents. Such an opening device can either be a completely or merely partially integrated part of the packaging container. In a very simple, but effective and well-functioning example of a design, an opening device of the type first mentioned above could consist of a tear perforation, along which a limited area of the container wall, delimited by said tear perforation, is intended to be torn off and removed, thus exposing and emptying hole through which the packaged product can be poured when the packaging container is to be drained of its contents.

The common type of packaging container has many advantageous and appreciated characteristics. It is easy to stack and arrange such containers in ways which enable efficient transportation and handling, and they provide the product with an excellent mechanical and physical protection for the entire duration of transporting and handling the packaging container, from filling and sealing to emptying and consumption. The packaging container is furthermore mechanically stable enough to be able to be easily picked up and held by hand when it is time to open it and consume its contents.

A drawback associated with the common type of packaging container, however, is that it practically always leaves a non-negligible amount of the fermented milk product remaining on its inner walls after it has been emptied. In the case of soured milk, for instance, it is not unusual for the amount of product remaining in the package to make up approximately 10% of the original amount in the packaging container, while the corresponding remaining product amount for crème fraîche can make up as much as 20% of the original product amount.

PURPOSE OF THE INVENTION

One purpose of the invention is thus to remove, or at least strongly reduce, the aforementioned problem which affects common methods.

Another purpose is to provide a packaging laminate of the common type for a packaging container enabling practically a complete emptying of its contents, even in the case of fermented liquid milk products.

Yet another purpose is to provide a filled packaging container of the type described initially which, unlike the common type of packaging container, allows for the entire contents of the container to be poured out and emptied, even in the case of fermented liquid milk products.

Additional advantages and advantages of the invention follow from the below description.

DESCRIPTION OF THE INVENTION

One aspect of the invention thus provides a packaging laminate comprised of a paper layer and outer liquid-tight layers on both sides of the paper layer. The packaging laminate is characterized by the free surface of one of the two outer liquid-right layers being covered by whey protein.

Within the context of the invention, the expression "whey protein" refers to the non-fat-soluble proportion of naturally occurring protein in ordinary cow's milk. According to *J. of Daily Research,* 79(01):53-59, 2012, ordinary cow's milk has the following natural composition:
  87.3% water,
  4.6% lactose,
  3.9% fat,
  3.25% protein,
  0.65% mineral substances,
  0.18% organic acids, and,
  0.14% miscellaneous.

The non-fat-soluble part of cow's milk (i.e., whey protein) makes up approximately 20% of the cow milk's total protein content, with approximately 80% primarily consisting of fat-soluble casein. In the summary above, the proportion of non-fat-soluble protein (i.e., whey) in cow's milk is thus $20/100 \times 3.25\% = 0.65\%$, while the cow milk's fat-soluble content (i.e., casein) makes up $80/100 \times 3.25\% = 2.60\%$.

Whey protein for the purposes of the invention can be obtained as a byproduct from traditional cheese production, when the fat-soluble part (i.e., casein) of the starting milk's (in this case the cow milk's) protein content is separated from the non-fat-soluble part (i.e., whey protein) and is used for the rest of the cheese manufacturing process, while the non-fat-soluble part (the whey protein) is saved and used for the purposes of the invention.

The whey protein coating on one of the two liquid-tight polyethylene layer surfaces next to the packaging laminate according to the invention is primarily produced out of dried powdered whey protein. The dried powdered whey protein is dissolved in water, and the resulting water solution is applied as required, and in the desired areas on the free surface of the liquid-tight outer layer by means of coating or printing. The applied water solution is then dried by means of the water being removed/evaporated through application of heat energy.

In order to reduce the amount of water that needs to be removed, and thus decrease the amount of energy consumed in this drying process, as much powdered whey protein as possible should be used in the water solution. In other words, the amount of powdered whey protein used should preferably correspond to the maximum amount the water solution can absorb, in order to ensure that as little water as possible needs to be removed in the drying process, while the largest possible amount of whey protein is applied on the polyethylene surface.

The composition of the powdered whey protein can vary from one cheese manufacturing process to another, and also from season to season, but generally, it has the following composition [C W Hall and T I Hendrick. *Drying Milk and Milk Products*. The AVI Publishing Comp Inc. 1966, Westport, Conn.]:

65-88% lactose,
1-17% whey protein,
0.7-10% minerals,
0.5-12% fat,
0.1-12% lactic acid,
2-15% water.

The invention defines the expression "soured milk" as encompassing a number of commercial milk products, which are all produced by means of fermentation with respective bacterial cultures. Typical bacterial cultures for producing soured milk include strains of *Streptococcus*, *Lactococcus* (a subcategory of *Streptococcus*) and *Leuconostoc*.

The expression "yogurt" refers to a group of fermented liquid milk products, which are produced by means of fermentation using a bacterial culture containing two strains of lactic acid bacteria, namely *Lactobacillus delbrueckii* subsp. *bulgaricus* and *Streptococcus salvarius* subsp. *thermophilus*. Yogurt can be found commercially both as unflavored and as a flavored milk product.

The expression "crème fraîche" refers to a liquid milk product produced by means of fermenting cream with a bacteria culture belonging to the strain of lactobacillus.

The invention is based on an observation, as unequivocal as it is surprising, involving a simple experiment using a substantially flat sheet, which had both of its sides coated with whey protein. The coated sheet was then lowered into a bowl filled with a fermented liquid milk product, in this case soured milk, and was kept immersed over several days. After this relatively long delay, the sheet was removed and held with both flat side surfaces in a vertical position, directly above the bowl, in order to allow as much of the accompanying milk product as possible to drain from the sheet. The experiment was repeated using a corresponding polyethylene sheet that did not have a whey protein coating. This sheet, which was used as reference, was also immersed in the filled bowl during the same time period as the other sheet, before it was removed and allowed to drain under the same conditions as those of the other sheet. The result was unequivocal, and made it abundantly clear that the sheet with both sides coated by whey protein was practically free of any remaining milk product, while the reference sheet, which lacked a corresponding coating, was more or less wholly coated in remaining product that had not drained off the polyethylene surfaces of the sheet.

Without being bound by any scientifically correct theory, this observation can be explained and clarified with the help of a simple working hypothesis, with the starting point being that there is an energy-induced competitive situation between fat and protein molecules present in the fermented product. Both types of molecules have an individual tendency to move towards and interact with available binding sites on a polyethylene surface in contact with the fermented product. Due to their differing molecular sizes, they move towards the fermented product at different rates, and thus reach these sites at different times. The smaller hydrophobic molecules move the fastest, and are thus quicker to reach, and to interact with, available hydrophilic sites on the surface. As a result, all available hydrophilic sites on the surface will be blocked sterically. Eventually, the larger and slower amphiphilic protein molecules also get there. Due to their amphiphilic character, they subsequently reach both the hydrophobic and hydrophilic sites on the surface and the previously bound fat molecules. Thereby, the previously blocked smaller fat molecules will gradually be pushed aside and simultaneously free the corresponding sites for successive additional protein molecules.

Due to the free surface of one of the two outer liquid-tight layers next to the packaging laminate being coated right from the start, i.e., prior to contact with the fermented liquid milk product, using a whey protein coating as the invention designates, all binding sites on this surface will thus be blocked and become unavailable for such competing fat and protein molecules. In other words, a fermented milk product that comes into contact with such a coated surface can no longer stick to it and remain on it.

The amount of whey protein used next to the packaging laminate according to the invention can vary depending on the type of fermented milk product for which it is intended, but the amount is generally less than 5 g/m$^2$, i.e. from 0.1 to 5 g/m$^2$, and in practice from 1 to 5 g/m$^2$. According to an embodiment, the amount is between 1 and 3 g/m$^2$, e.g. 2 g/m$^2$.

According to an embodiment, the coating (14) comprises from 50 to 100 wt-% whey protein, preferably 100 wt-% whey protein, natural substance. Since whey is a natural product, derived from renewable sources, and is a food substance in itself, it has the advantage of further supporting the packaging goals of environmental sustainability and food safety.

Since a whey protein coating cannot be sealed by means of heat sealing, either at all or to an insufficient degree, a preferable packaging laminate design, according to the invention, excludes coating such areas of the packaging laminate's whey-coated outer polyethylene layer, which are intended to be used for heat sealing once the packaging laminate is converted into a packaging container.

Both outer liquid-tight surfaces of the packaging laminate can, but do not necessarily, consist of the same material. Examples of suitable materials for both layers include polyolefins, or blends of polyolefins, such as polyethylene and polypropylene and copolymers based on olefin monomers, preferably polyethylene. The invention defines the term "polyethylene" to refer to polyethylene chosen from a group consisting of low-density polyethylene (LDPE), linear low-density polyethylene (LLDPE), metallocene-catalysed LLDPE and high-density polyethylene (HDPE). For purposes of clarification, it should be added that polyethylene of the low-density polyethylene (LDPE) type and linear low-density polyethylene (LLDPE) may have a density of 0.900-0.945 $g/cm^3$, such as 0.900-0.945 $g/cm^3$, while polyethylene of type high-density polyethylene (HDPE) type normally has a density exceeding 0.930-0.945 $g/cm^3$.

A practical design approach provides the packaging laminate in the form of a substantially rectangular, flat-folded tubular material, with one of its pairs of opposing edges connected to one another by means of a liquid-tight sealing seam, with the packaging laminate's protein-coated surface freely exposed on the inside of the tubular material.

According to another practical design approach, the packaging laminate is provided in the form of a rolled web of connected packaging materials.

Another aspect of the invention includes the provision of a sealed packaging container consisting of a fermented liquid milk product, where the packaging container is produced from a packaging laminate with a rigid but foldable paper layer and outer liquid-tight layers out of polyolefin, such as polyethylene, on both sides of the paper layer. The packaging container is characterized by having a whey protein surface coating which is in contact with the fermented liquid milk product on the inside of the packaging container.

According to a practical design approach, the packaging container is produced from a substantially rectangular, flat-folded tubular material out of the packaging laminate according to the invention, with one of the pairs of the opposing edges of this material connected to one another by means of a liquid-tight overlap seam, with the packaging laminate's protein-coated surface turned inwards in the tubular material. The flat-folded tubular material is first raised to an open tubular container capsule, one end of which is sealed by fold forming and heat-sealing of foldable connected end panels at the end of the container capsule, forming a substantially flat bottom seal. The container capsule, now provided with a bottom, is filled with the actual fermented liquid milk product through its open end, and is then sealed by fold-forming and heat sealing of the corresponding foldable and connected end panels at the top end of the container capsule, forming an openable top seal.

Another practical design approach produces the packaging container from a material web out of the packaging laminate according to the invention. The web is reshaped into a tube by the web's two longitudinal being joined by means of a longitudinal liquid-tight sealing seam, with the protein-coated surface turned inwards in the tube. The tube is filled with a fermented liquid milk product, and divided into connected pillow-shaped packaging units, by means of repeated transverse flat pressing and heat sealing of the tube across the tube's longitudinal direction below the tube's product level. The filled pillow-shaped packaging units are separated from one another by means of cuts in the transverse sealed areas, and are given the desired geometrical shape, preferably parallelepipedic, by means of at least one additional flat-folding operation.

SHORT FIGURE DESCRIPTION

Advantageous practical designs relating to the invention will be described more closely below, using references to the enclosed drawings, which include the following elements:

FIG. 1 is a schematic cross-section of the packaging laminate according to the invention.

Figure 2:
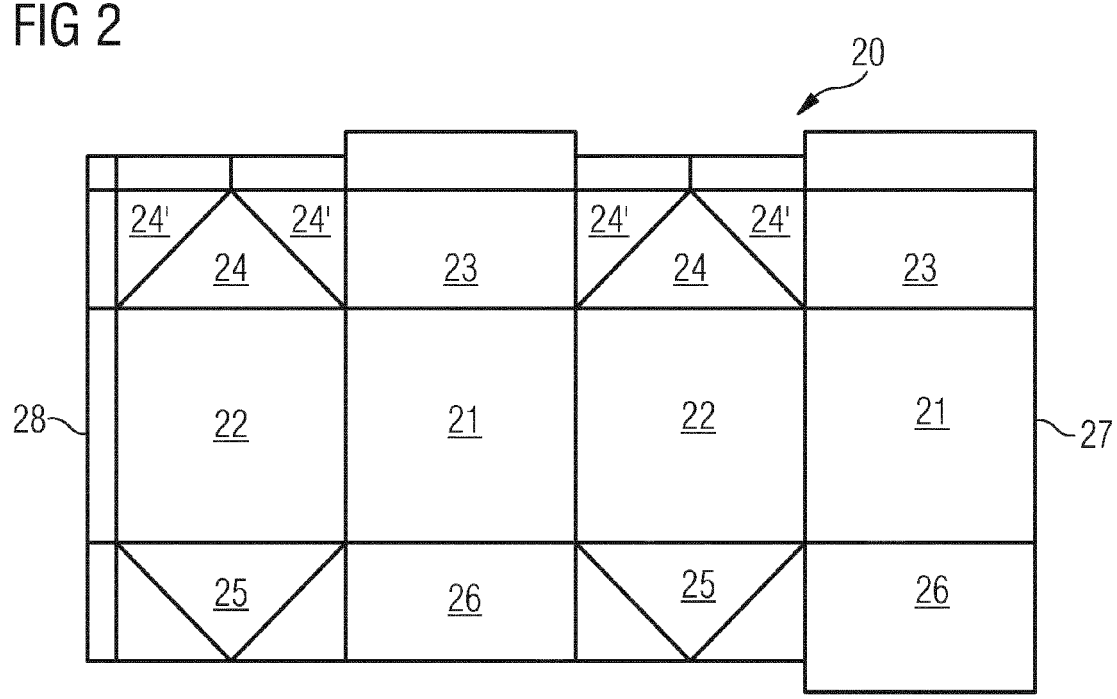

FIG. 2 provides a schematic view of a substantially rectangular material out of the packaging laminate in FIG. 1.

Figure 3:
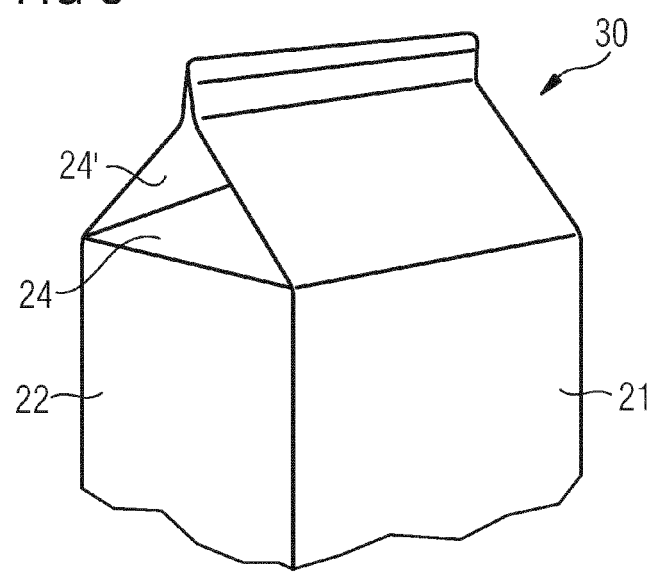

FIG. 3 provides a schematic view of the top part of a common type of packaging container produced by means of flat-forming and heat sealing of the material in FIG. 2.

Figure 4:
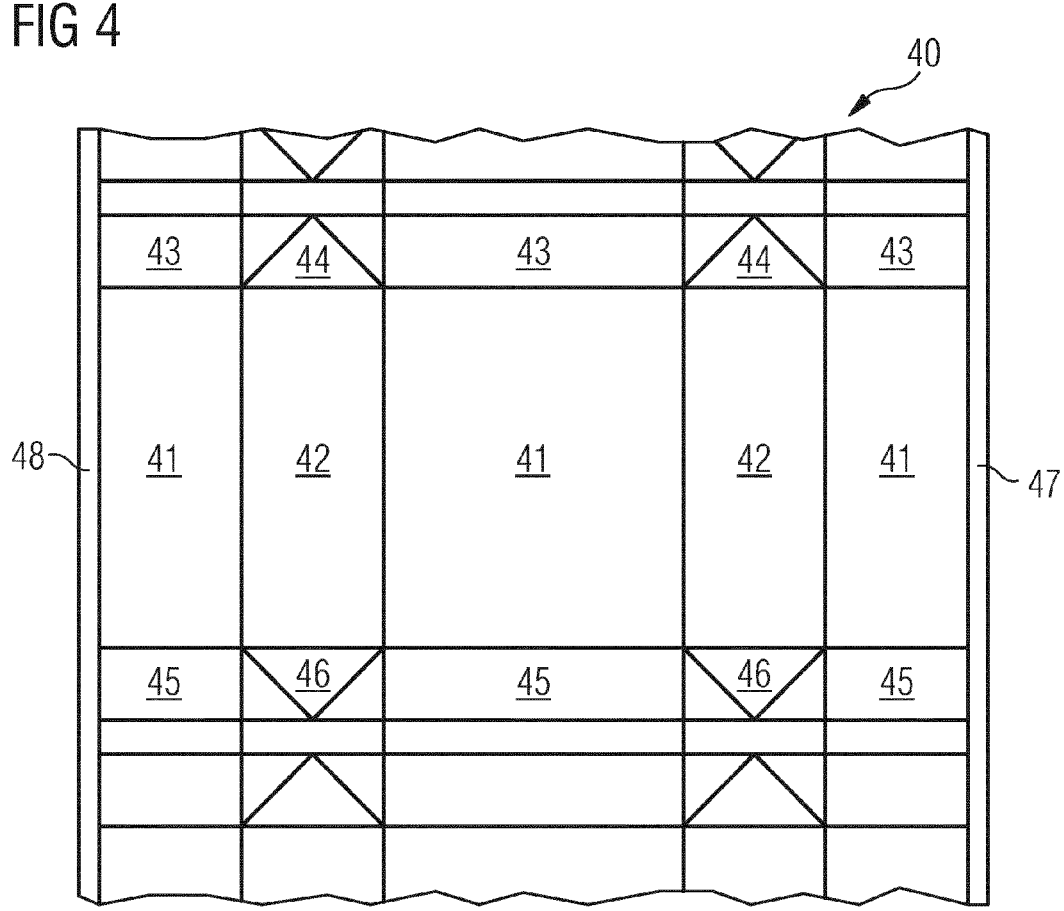
Figure 5:
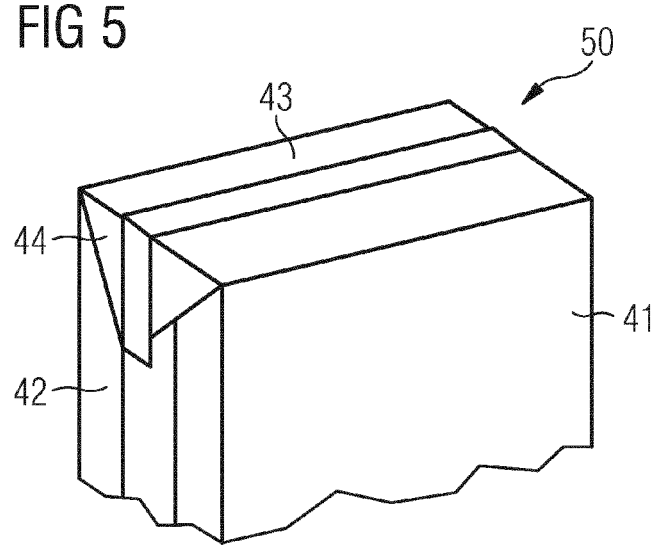

FIG. 4 provides a schematic view of a part of a web of connected materials out of the packaging laminate in FIG. 1, and, FIG. 5 provides a schematic view of the top part of another common type of packaging container produced by means of flat-forming and heat sealing of the web-shaped material in FIG. 4.

DETAILED FIGURE DESCRIPTION

FIG. 1 thus shows a schematic cross-section of the packaging laminate according to the invention. The packaging laminate with the general designation 10 has a mechanically rigid but foldable layer 11 made of paper, and outer liquid-tight layers 12 and 13 out of polyethylene (PE) on both sides of the paper layer 11. Packaging laminate 10 furthermore has a whey protein coating 14 on the freely exposed surface of layer 13, which is one of the two outer layers. As will be described in greater detail below, the invention stipulates that coating 14 next to packaging laminate 10 be applied on the surface of outer layer 13, which is intended to be turned inward in one of the packaging containers for a fermented liquid milk product, produced from packaging laminate 10.

Both outer liquid-tight layers 12 and 13 can consist of low-density polyethylene (LDPE) with a density of 0.910-0.945 $g/cm^3$, linear low-density polyethylene (LLDPE) with a density of 0.900-0.945 $g/cm^3$, such as 0.910-0.945 $g/cm^3$, or high-density polyethylene (HDPE) with a density exceeding 0.930-0.945 $g/cm^3$, or blends of any of these polymers.

Whey protein coating 14 on outer polyethylene layer 13 may be applied by means of dispersion coating, but is preferably applied using a printing technology, such as flexographic printing, deep printing etc. Printing technology has the advantage that it easily allows for coating only selected areas of the surface of outer layer 13. Such selective surface coating is necessary in cases where packaging laminate 10 is intended to be reshaped into a packaging container by means of flat-forming and heat sealing, as will be described in greater detail below.

The amount of whey protein in coating 14 next to packaging laminate 10 can be as high as 5 $g/m^2$, but is generally between 1 and 3 $g/m^2$, e.g., 2 $g/m^2$.

Packaging laminate 10 according to the invention is e.g., provided in the form of a substantially rectangular sheet-shaped packaging material, such as shown schematically in FIG. 2, or as a web of connected packaging materials, which is partially shown schematically in FIG. 4.

The substantially rectangular sheet-shaped packaging material with general designation 20 in FIG. 2 is divided by way of a pattern of folding lines in side wall fields 21 and 22, top sealing fields 23 and 24 and bottom sealing fields 25 and 26. Top sealing fields 24 and bottom sealing fields 25 are triangular and laid out in a way that enables them to be folded in between top sealing fields 23 and bottom sealing fields 26 in a bellows-like fashion. When folding triangular fields 24 and 25 in this way, the connected triangular fields 24 are folded back so that they lie between fields 23 and 24 and fields 26 and 25, respectively. This top and bottom construction is often seen on many so-called gable top cartons. FIG. 3 shows top part 30 of such a typical gable top carton.

Prior to transportation from production line to filling machine line and reshaping into filled prepackaged containers (of which the typical top part 30 is shown schematically in FIG. 3), opposing edges 27 and 28 of packaging material 20 are heat-sealed and joined in a liquid-tight overlap seam in order to give packaging material 20 a flat-folded shape. The invention stipulates that packaging material 20 is joined, heat sealed and flat-folded in such a way that outer protein-coated layer 13 of packaging laminate 10 is turned inwards in flat-folded tubular packaging material 10.

For reshaping to filled sealed packaging containers, of the type whose top part 30 is shown schematically in FIG. 3, the flat-folded tubular packaging material is first raised to an open tubular container capsule that may, but does not necessarily, have a quadratic cross-section. The raised container capsule is then sealed at one of its open ends through flat-forming and heat sealing of the packaging material's foldable connected bottom sealing fields 25 and 26, thus forming a substantially flat bottom seal. The container capsule, now provided with a bottom, is filled with the required product, in this case a fermented liquid milk product, through its open end. After this filling process, the open end of the tubular container capsule is sealed by way of flat-forming and heat sealing of corresponding foldable connected top sealing fields 23 and 24 as described above, at one of the ends of the container capsule, in order to provide the finished prepackaged container with a top sealing 30 of the type shown in FIG. 3.

As previously mentioned, the invention allows the packaging laminate to be supplied in the form of a web of foldable connected packaging materials. The schematics in FIG. 4 show part of such a web including a whole packaging material 30 between two corresponding packaging materials that are only partially shown. Packaging material 40 is, similarly to packaging material 20 shown in FIG. 20, divided by way of a pattern of folding lines in side wall fields 41 and 42, top sealing fields 43 and 44 and bottom sealing fields 45 and 46.

From the material web in FIG. 4, filled sealed packaging containers are produced, belonging to the common type shown in FIG. 5 and having a substantially parallelepipedic shape. The material web is first reshaped into a tube by the web's two longitudinal edge zones 47 and 48 being connected and joined in a longitudinal liquid-tight overlap seam. According to the invention, this tubular shaping is to be carried out in such a way that protein-coated outer layers 13 of packaging laminate 10 are turned inwards in the shaped tube. The tube is filled with the required product, in this case of fermented liquid milk product, and divided into individual filled packaging units, by means of repeated transverse compression and heat sealing of the tube across the tube's longitudinal direction below the tube's product level. The packaging units are separated from one another and given the desired geometrical shape, generally parallelepipedic, by at least one further process of flat-forming and heat sealing, resulting in finished prepackaged containers of the common type whose top part is shown schematically in FIG. 5.

For purposes of clarity, the same designations have been used in FIG. 5 and FIG. 4 for corresponding parts. The parallelepipedic packaging container thus includes a substantially flat top seal 43 and four paired opposite vertical side walls 41,41 and 42,42, and has a substantially rectangular cross-section.

Even though the invention has been described with special references to packages of the type shown on attached drawings, it is not strictly limited to such dimensionally stable packaging. The invention can be applied just as well to other types of packages, such as flexible bags, which differ substantially from the previously described types, with respect to choice in the paper layers of the packaging laminate. While the dimensionally stable packages are produced by a packaging laminate with a rigid but foldable paper layer, the latter types of bag-like packages may be produced out of a corresponding packaging laminate in which the paper layer is thin and flexible. Both these types of packages are covered by the envisioned scope of the invention, as defined in the subsequent patent requirements.

Other packages suitably and commonly used for the packaging of fermented liquid or semi-liquid food products are bottle-type carton-based packages, manufactured by attaching a plastics moulded top and opening arrangement to a bottle sleeve formed from a laminated packaging material comprising a core layer of rigid but foldable paper or cellulose-based bulk layer. Commercial examples of such bottle-like packages are Tetra Top® packages and Tetra Evero® Aseptic packages.

INDUSTRIAL USEFULNESS

The packaging laminate described in the invention is intended for production of packaging containers for a fermented liquid milk product, such as soured milk, yogurt and crème fraîche. The packaging laminate is specifically intended for such openable packaging containers, which are to be emptied of their contents by way of pouring the contents out from the opened package.

The invention claimed is:

1. Packaging laminate configured to form a packaging container containing a fermented liquid or semi-liquid milk product, the packaging laminate comprising a paper or cellulose-based layer and outer liquid-tight layers on both sides of the paper or cellulose-based layer, wherein one of the two outer liquid-tight layers faces toward an interior of the packaging container after the packaging laminate is formed into the packaging container, and a whey protein coating on the one outer liquid-tight layer's free surface, the whey protein coating possessing a free surface constituting an inner surface of the packaging container that is in contact with the fermented liquid or semi-liquid milk product after the packaging laminate is formed into the packaging container filled with the fermented liquid or semi-liquid milk product, the whey protein coating preventing the fermented liquid or semi-liquid milk product from sticking to the inner surface of the packaging container upon emptying the fermented liquid or semi-liquid milk product from the packaging container.

2. Packaging laminate configured to form a packaging container containing a fermented liquid milk product according to claim 1, wherein the paper or cellulose-based layer is a paper.

3. Packaging laminate configured to form a packaging container containing a fermented liquid milk product according to claim 1, wherein the whey protein coating comprises from 50 to 100 wt-% whey protein.

4. Packaging laminate configured to form a packaging container containing a fermented liquid milk product according to claim 1, wherein the whey protein coating consists of whey protein.

5. Packaging laminate configured to form a packaging container containing a fermented liquid milk product according to claim 1 wherein both outer liquid-tight layers comprise a polyolefin or an olefin-monomer based copolymer.

6. Packaging laminate configured to form a packaging container containing a fermented liquid milk product according to claim 5, wherein the material in both outer liquid-tight layers is polyethylene.

7. Packaging laminate configured to form a packaging container containing a fermented liquid milk product according to claim 1 wherein the paper or cellulose-based layer is a rigid but foldable paper layer.

8. Packaging laminate configured to form a packaging container containing a fermented liquid milk product according to claim 1, wherein the whey protein coating comprises less than 5 g/m$^2$ of whey protein.

9. Packaging laminate configured to form a packaging container containing a fermented liquid milk product according to claim 8, wherein the whey protein coating comprises from 1 to 5 g/m$^2$ of whey protein.

10. Sheet or web-shaped material from a packaging laminate configured to form a packaging container according to claim 7, wherein the packaging laminate has a pattern of weakening lines intended to facilitate folding, along which the packaging laminate is intended to be folded when the packaging laminate is reshaped into a packaging container.

11. Packaging laminate configured to form a packaging container containing a fermented liquid milk product according to claim 8, wherein the whey protein coating comprises from 1 to 3 g/m$^2$ of whey protein.

12. Packaging laminate configured to form a packaging container containing a fermented liquid milk product according to claim 8, wherein the whey protein coating comprises about 2 g/m$^2$ of whey protein.

13. Packaging laminate configured to form a packaging container containing a fermented liquid milk product according to claim 1, wherein the whey protein coating is omitted from areas of the liquid-tight layer which are intended to be sealed by way of heat sealing when the packaging laminate is formed into the packaging container.

14. Packaging laminate for a packaging container for a fermented liquid or semi-liquid milk product, the packaging laminate comprising a paper or cellulose-based layer and outer liquid-tight layers on both sides of the paper or cellulose-based layer, wherein one of the two outer liquid-tight layers has a protein coating on its free surface, wherein the protein coating is omitted from areas of the liquid-tight layer which are intended to be sealed by way of heat sealing when the packaging laminate is reshaped into a packaging container.

15. Packaging laminate according to claim 14, wherein the protein coating comprises from 50 to 100 wt-% whey protein.

16. Packaging laminate according to claim 14, wherein the protein coating consists of whey protein.

17. Packaging laminate according to claim 14, wherein the protein coating comprises from 1 to 5 g/m$^2$ of whey protein.

18. Packaging laminate according to claim 14, wherein both outer liquid-tight layers comprise a polyolefin or an olefin-monomer based copolymer.

19. A packaging container possessing an interior containing a fermented liquid or semi-liquid milk product, the packaging container being comprised of a paper or cellulose-based layer, outer liquid-tight layers on both sides of the paper or cellulose-based layer, and a whey protein coating on at least one of the two outer liquid-tight layers, the whey protein coating constituting an inner surface of the packaging container and being in contact with the fermented liquid or semi-liquid milk product in the interior of the packaging container, the whey protein coating preventing the fermented liquid or semi-liquid milk product from sticking to the inner surface of the packaging container upon emptying the fermented liquid or semi-liquid milk product from the packaging container.

20. The packaging container according to claim 19, wherein the coating comprises from 50 to 100 wt-% whey protein.

* * * * *